United States Patent [19]
Nakano et al.

[11] Patent Number: 5,274,513
[45] Date of Patent: Dec. 28, 1993

[54] SEARCH SYSTEM FOR HELICAL SCAN DIGITAL DATA REPRODUCTION APPARATUS

[75] Inventors: Hidemi Nakano; Seiji Higurashi, both of Tokyo, Japan

[73] Assignee: Victor Company of Japan, Ltd., Japan

[21] Appl. No.: 636,456

[22] Filed: Dec. 31, 1990

[30] Foreign Application Priority Data

Jan. 6, 1990 [JP] Japan ................................ 2-778

[51] Int. Cl.$^5$ .............................................. G11B 15/18
[52] U.S. Cl. ........................................ 360/72.2; 360/74.4; 360/49
[58] Field of Search ............... 360/72.2, 73.06, 73.12, 360/73.13, 74.4

[56] References Cited

U.S. PATENT DOCUMENTS

| | | | |
|---|---|---|---|
| 3,851,116 | 11/1974 | Cannon | 360/72.2 |
| 4,367,499 | 1/1983 | Hoshino | 360/72.2 |
| 4,707,749 | 11/1987 | Nishijima et al. | 360/72.2 |
| 5,016,119 | 5/1991 | Ogawa et al. | 360/72.2 |

FOREIGN PATENT DOCUMENTS

| | | |
|---|---|---|
| 272130 | 12/1987 | European Pat. Off. . |
| 323910 | 1/1989 | European Pat. Off. . |
| 327188 | 4/1989 | European Pat. Off. . |
| 3016059 | 4/1980 | Fed. Rep. of Germany . |
| 63-94494 | 4/1988 | Japan . |
| 63-187490 | 8/1988 | Japan . |
| 63-213189 | 9/1988 | Japan . |
| 63-244436 | 10/1988 | Japan . |
| 1-92945 | 4/1989 | Japan . |
| 1-320657 | 12/1989 | Japan . |
| WO84/02221 | 11/1983 | PCT Int'l Appl. . |

OTHER PUBLICATIONS

Dare et al., Rotating Digital Audio Tape (R-Dat): A Format Overview, SMPTE J., Oct. 1987, pp. 943-948.

*Primary Examiner*—David L. Robertson
*Attorney, Agent, or Firm*—Lowe, Price, LeBlanc & Becker

[57] ABSTRACT

A helical scan digital data reproduce apparatus of the invention provides absolute searching of a desired program with the program numbers recorded on a helical track during travelling a recording medium at a high seed in the fast-forward or rewinding mode because the apparatus calculates the program number by counting the index signals recorded on a fixed track during searching. If the program number has not been detected because just after putting a cassette tape, the apparatus once reproduce the magnetic tape to read the program number before winding the magnetic tape.

17 Claims, 6 Drawing Sheets

| ADDRESS | DATA (8bit) | | |
|---|---|---|---|
| 1, 17 | ITEM=0.100 | PNO-1 (4bit) | AC1 |
| 3, 19 | PNO-2 (4bit) | PNO-3 (4bit) | AC2 |
| 5, 21 | INDEX NO. (8bit) | | AC3 |
| 7, 23 | | | AC4 |
| 9, 25 | PNO (8bit) | | SC1 |
| 11, 27 | INDEX NO. (4bit) | PSF (1bit) | HOUR (3bit) | SC2 |
| 13, 29 | HOUR (LOWER 2bit) | MINUTE (6bit) | SC3 |
| 15 | MINUTE (LOWER 2bit) | SECOND (6bit) | SC4 |

| ADDRESS | DATA (8bit) |
|---|---|
| 0, 8, 16, 24 | |
| 1, 9, 17, 25 | OPTIONAL CODE |
| 2, 10, 18, 26 | |
| 3, 11, 19, 27 | OPTIONAL CODE |
| 4, 12, 20, 28 | |
| 5, 13, 21, 29 | OPTIONAL CODE |
| 6, 14, 22 | |
| 7, 15, 23 | OPTIONAL CODE |

SEARCH SYSTEM FOR HELICAL SCAN DIGITAL DATA REPRODUCTION APPARATUS

BACKGROUND OF THE INVENTION

1. Field of the Invention

This invention relates t a helical scan digital data reproduction apparatus, and particularly relates to a helical scan digital data reproduction apparatus suited for a digital audio tape recorder and a PCM audio VTR.

2. Description of the Prior Art

A digital audio tape recorder (DAT) in the form of a helical scan digital reproduction apparatus is known which can record a digital audio signal on a magnetic tape. In such a digital audio tape recorder, searching for a desired program is carried out by using an index signal, a program number, or a START-ID code. The index signal is recorded on a longitudinal track at the beginning of a program to indicate a start timing of a program. The program number is recorded at a predetermined portion of a helically scanned track in an ID-code form to indicate an ordinal number of one of a plurality of programs and is recorded at a beginning of the program if there is no interval between the preceding program and the following program, or recorded at a beginning of the interval if there is the interval. The START-ID is recorded at a predetermined portion of a helically scanned track in the ID-code form at a beginning of a program. The index signal can be detected during rewinding, fast-forwarding, and high speed reproducing modes because it is reproduced from the longitudinal track by a fixed head. On the other hand, the program number and the START-ID cannot be detected during rewinding, fast-forwarding, and high speed reproducing modes because they are reproduced by rotary heads. The START-ID is used in the DAT while, in a PCM audio VTR, a program start flag is used. The program start flag corresponds to the START-ID and is also recorded at a predetermined portion of a helically scanned track in the ID-code form at a beginning of a program and also cannot be detected during rewinding, fast-forwarding, and high speed reproducing modes because they are reproduced by rotary heads.

When an index signal is used, a prior art digital audio tape recorder can search for a desired program data in accordance with a manually inputted ordinal number indicating a distance from the present tape position. This type of index search is a relative search, because the input ordinal number indicates a relationship to the present tape position. However, such a recorder cannot perform absolute searching wherein a program is located according to a single program number indicating an ordinal number relationship with respect to the beginning of the magnetic tape.

An absolute search is possible when program numbers represented by ID codes are used. However, in the PCM audio VTR it is difficult to read out the ID code except in a program reproduction mode. Therefore, the ID code cannot be used in a search mode when the recording medium is being wound or rewound at a high speed (fast forward or rewind modes).

Moreover, if a user inputs program number to be searched, it is impossible to search for a program if the program number of the present position of the tape has not been detected, for example just after placing the cassette in the digital audio tape recorder.

This invention is developed to overcome the above-mentioned problem and to perform absolute searching according to the program number in modes other than the program reproduction mode.

SUMMARY OF THE INVENTION

A helical scan digital data reproduction apparatus in accordance with the invention provides absolute searching of a desired program. Program numbers are recorded on a helical track during travelling of a recording medium at a high speed in the fast-forward or rewinding mode. Specifically, the apparatus calculates the program number by counting the index signals recorded on a fixed track during searching. If the program number has not been detected because a cassette tape has just been placed into the apparatus, the apparatus first reproduces the magnetic tape to read the program number before winding the magnetic tape.

According to the present invention there is provided a helical scan digital data reproduction apparatus for reproducing data from a magnetic recording medium on which each helically scanned track includes a plurality of information blocks, each block including a synchronizing signal, an identification code including a program number and data for reproduction, an index signal being recorded on a longitudinal control track by changing a duty ratio of a control signal at the start of a program, the apparatus including: an input circuit for inputting a desired program number to be searched; a helical scanning head for reading out a synchronizing signal, the data, and the identification code from the magnetic recording medium; a synchronizing signal detection circuit responsive to an output of the helical scanning head for detecting the synchronizing signal; a separation circuit responsive to an output of the helical scanning head for separating the data and the identification code in accordance with a given timing determined by the synchronizing signal; a detecting circuit responsive to the identification code for detecting and outputting the program number; a control head for reading the control signal on the longitudinal control track; an index signal detection circuit for detecting the index signal from the control signal; and a control circuit responsive to the desired program number, the detected program number, and the index signal for searching the start of a program corresponding to the desired program number in accordance with a difference between the detected program number and the desired program number, the difference being changed in response to the index signal in a searching mode.

BRIEF DESCRIPTION OF THE DRAWINGS

The foregoing and other objects and features of the present invention will become more readily apparent from the following detailed description taken in conjunction with the accompanying drawings in which.

The same or corresponding elements or parts illustrated in different figures are designated by like reference numerals throughout the drawings.

DETAILED DESCRIPTION OF THE INVENTION

Figure 1:
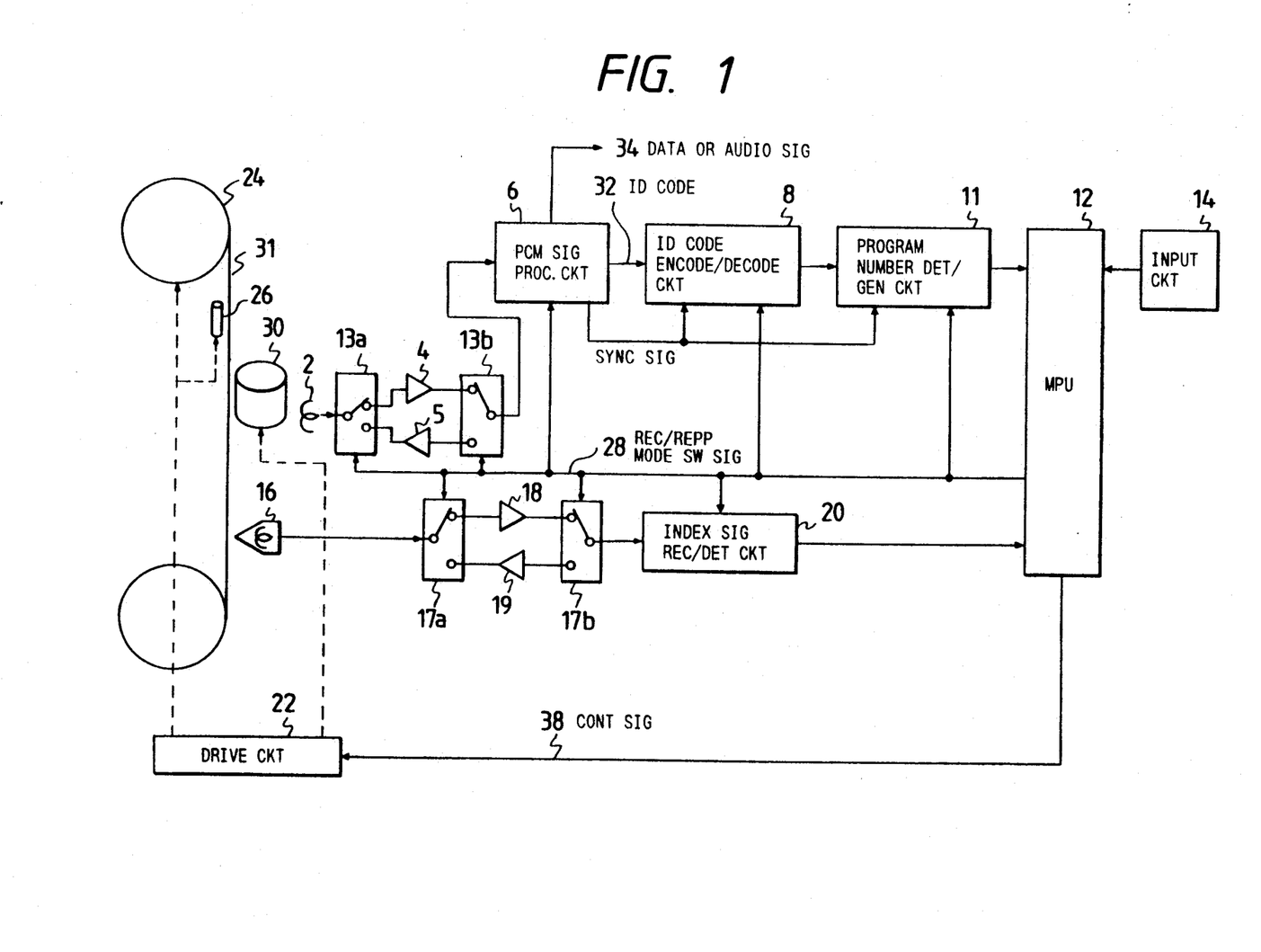
FIG. 1 is a block diagram of an embodiment of a data reproduction apparatus of the invention, in the reproducing and searching modes.

Hereinbelow will be described a first embodiment of this invention. FIG. 1 is a block diagram of an embodiment of a PCM audio VTR, in the form of a helical scan digital data reproduction apparatus of the invention.

In FIG. 1, a magnetic tape 31 travels across a capstan 26 and is wound by a take up reel 24. Digital data recorded along plural tracks made by helical scanning is reproduced by a pair of rotary heads 2 (only one of which is shown) which are actually mounted on the rotary cylinder 30. The signal reproduced by the head 2 is fed to an amplifier 4 through a switch 13a. The switch position is set in response to a record/reproduce signal 28. The amplified signal is applied to a PCM signal processing circuit 6 through switch 13b which is also set in response to the record/reproduce mode switching signal 28. These switches and switches 17a and 17b are all controlled by the record/reproduce mode switching signal 28.

The PCM signal processing circuit 6 detects a synchronizing signal and separates the amplified reproduced digital data into data or audio signal 34 and ID codes, in response to the synchronizing signal. The synchronizing signal is recorded on the magnetic tape 31 at a beginning of each block in every field or track as a specified code. An ID code is recorded at given regions of the track. Thus, the ID code can be separated with reference to the synchronizing signal. ID codes separated by the PCM signal processing circuit 6 are sent to an ID code encode/decode circuit 8 for decoding the ID code. The decoded ID codes are sent to a program number detection/generating circuit 11 for detecting a program number with reference to the synchronizing signal. The program number is recorded on the magnetic tape in the region of the ID code at a given space. Thus, the program number can be detected by referring to the synchronizing signal. The detected program number, in the form of an ordinal number of a data train, is supplied to a microprocessing unit (MPU) 12.

The magnetic tape 31 is also scanned by a fixed control head 16 for controlling tracking. An index signal of a program is recorded on the magnetic tape 31 by changing a magnetizing pattern on the control track, for example the duty ratio of a signal recorded on the control track. The control signal reproduced by the control head 16 is sent to an index signal record/detecting circuit 20 through amplifier 18. The index signal record/detecting circuit 20 detects the index signal and sends it to the microprocessing unit 12.

The record/reproduce mode switching signal 28 is produced by the microprocessing unit 12 in response to an input circuit 14 and changes the ID code encode/decode circuit, the program number detection/generation circuit 11, the index signal recording/detection circuit 20, and switches 17a and 17b between the reproduction and recording modes. Input circuit 14 produces commands of reproduce, record, fast-winding, rewinding, and search modes and also produces a program number to be searched in response to manual operation. The microprocessing unit 12 sends a control signal 38 to a drive circuit 22 for driving the rotary cylinder 30, the capstan 26, the take-up reel 24 to perform the reproduction, recording, fast-winding, rewinding, and search modes in accordance with a program stored therein. Hereinbelow will be described operation of this embodiment.

Figure 7:
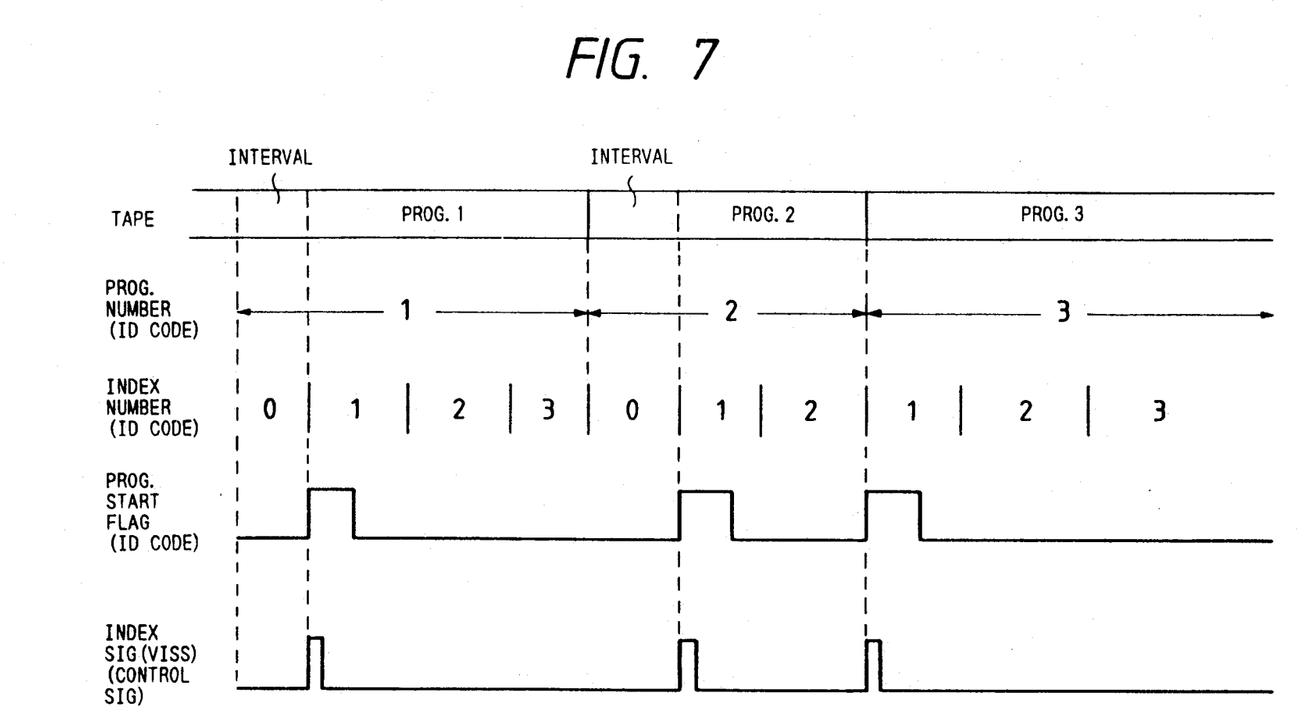
FIG. 7 schematically illustrates the relation between programs recorded on the magnetic tape, program numbers, index numbers, program start flags, and index signals.

FIG. 7 shows schematically a signal recorded on the magnetic tape.

In this embodiment, three programs are recorded. Header portions of the first two programs have respective interval portions where substantially no audio signal is recorded. A header of the third program has no interval portion. The index number (ID code) recorded on the region of the ID code on a helically scanned track is set to zero at the interval portion and is then increased by one at given intervals. The program start flag recorded on the region of the ID code on a helically scanned track is set for a given interval just after a change of the index number to 1. The index signal is also produced for a given interval just after the change of the index number to 1.

A searching operation by the digital data recorder/player apparatus according to the invention will be described further with reference to a flow chart shown in FIG. 8.

Figure 8:
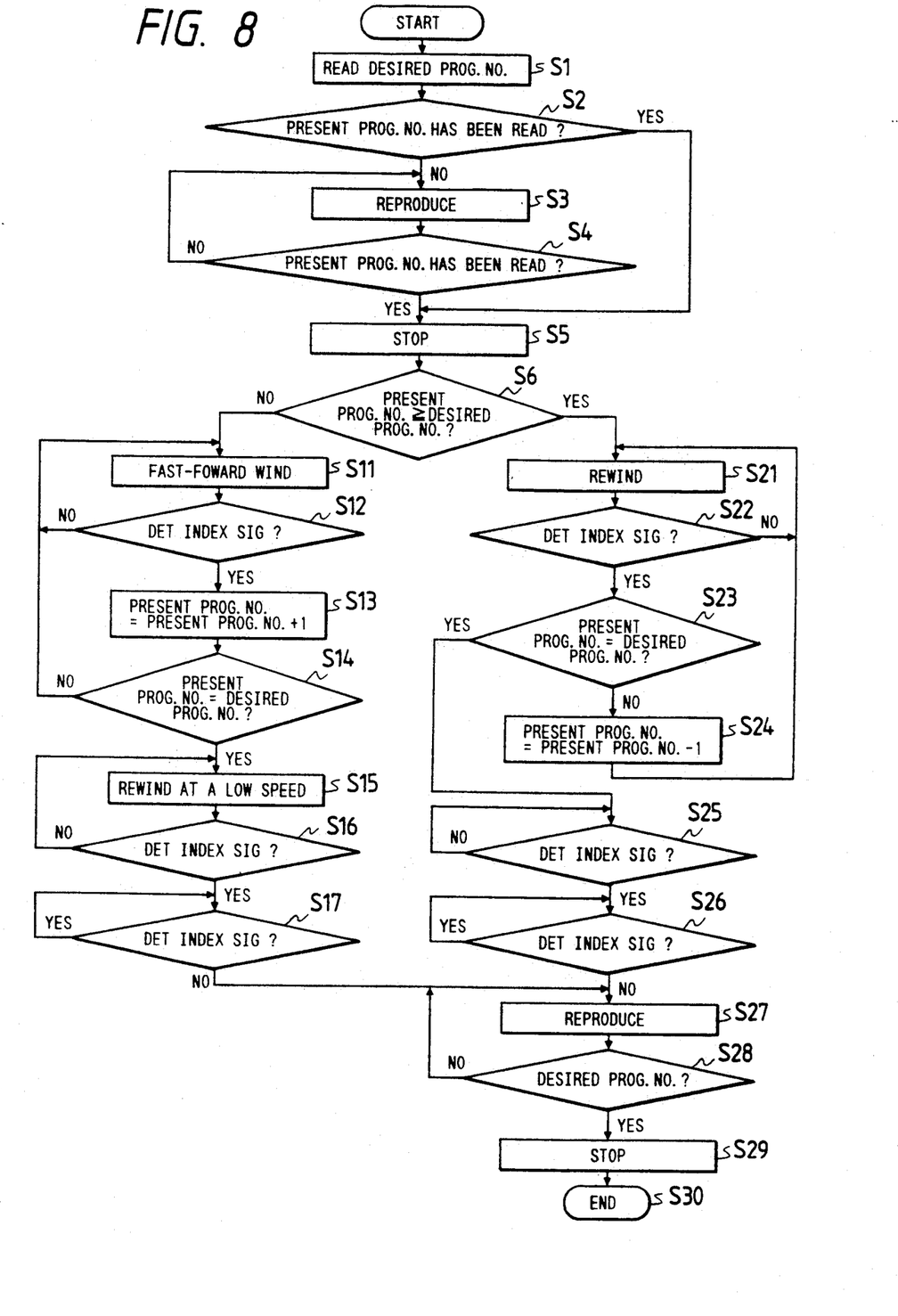
FIG. 8 is a flow chart illustrating operation of one embodiment of the present invention.

An initializing is made before start of the flow of FIG. 8. During initializing, a largest possible number, the largest number which can be stored in a memory area assigned to a variable of the program number, is set to that area, which is included in the microprocessor 12. At first, a program number to be searched is inputted by a user and read by the microprocessing unit 12 (step S1), as shown in FIG. 8. The microprocessing unit 12 checks whether the program number at the present tape position has been detected by checking whether the variable of the program number is a reasonable number which represents a normally existing number of programs recorded on a magnetic tape 31 through normal operations. If NO, the microprocessing unit 12 first sets the system to the reproducing mode. Then, the signals recorded on the magnetic tape 31 are reproduced by moving the tape at a reproducing speed (steps S2 and S3). As a result, when the desired program number being searched is detected, the apparatus is set into a stop mode (steps S2, S4, and S5). If YES in step S2, processing proceeds to step S5 where the stop mode is set.

In the following step S6, the microprocessing unit 12 makes a decision as to whether the program number at the present tape position is greater than that of the desired program. If the program number being searched is greater than that of the present tape position, the magnetic tape 31 is moved in the fast-forward mode to step S11. During this movement, when the index signal is detected in step S12, the program number of the present tape position is increased by one in step S13 and is then compared with the program number being searched in step S14. If the program number of the present tape position is not equal to the desired program number being searched, the fast-forward mode is continued.

When the two program numbers are equal to each other, rewinding at a low speed is executed in step S15 to return the magnetic tape 31 to a point just before an index signal (i.e., to the end point of a program just preceding the desired program being searched) for correction of the overrun (steps S15 and S17).

Figure 9:
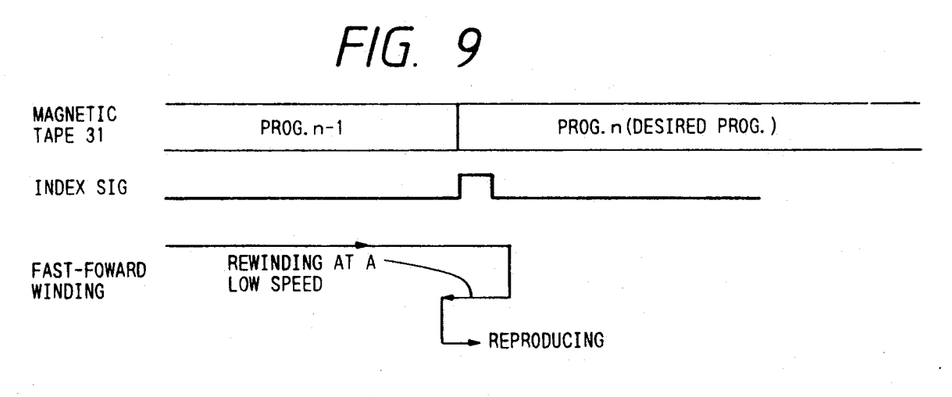
FIGS. 9 and 10 schematically illustrate operation at end of searching.

FIG. 9 illustrates the above-mentioned operation with respect to the magnetic tape 31.

On the other hand, if the program number being searched for is smaller than or equal to that of the present tape position in step S6, the magnetic tape 31 is rewound in step S21.

When the index signal recorded on the control track is detected during rewinding of the magnetic tape 31, the program number of the present position is compared with that being searched in steps S22 and S23. If the program number of the present tape position is not equal to the searched for program number, the program number of the present position is decreased by one in step S24 and the rewinding in continued.

When the two program numbers are determined to be equal to each other in step 23, the magnetic tape 31 is rewound to an end of an index signal (an end point of a program just preceding the desired program being searched for) in steps S25 and S26.

Figure 10:
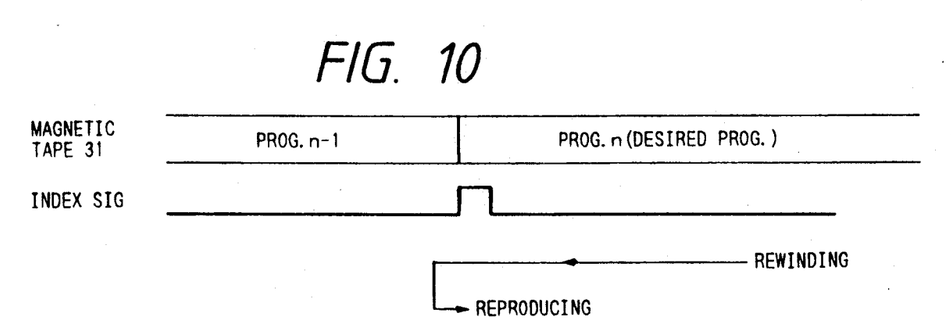

FIG. 10 illustrates the above-mentioned operation with respect to the magnetic tape 31.

In both fast-forward winding and rewinding, if an end point of an index signal is detected in steps S17 and S26, the apparatus is set into the reproducing mode and the program number is read out in step S28. Then, at the instance that the program number reaches the number searched for, the stop mode is executed in steps S29 and S30.

Figure 2:
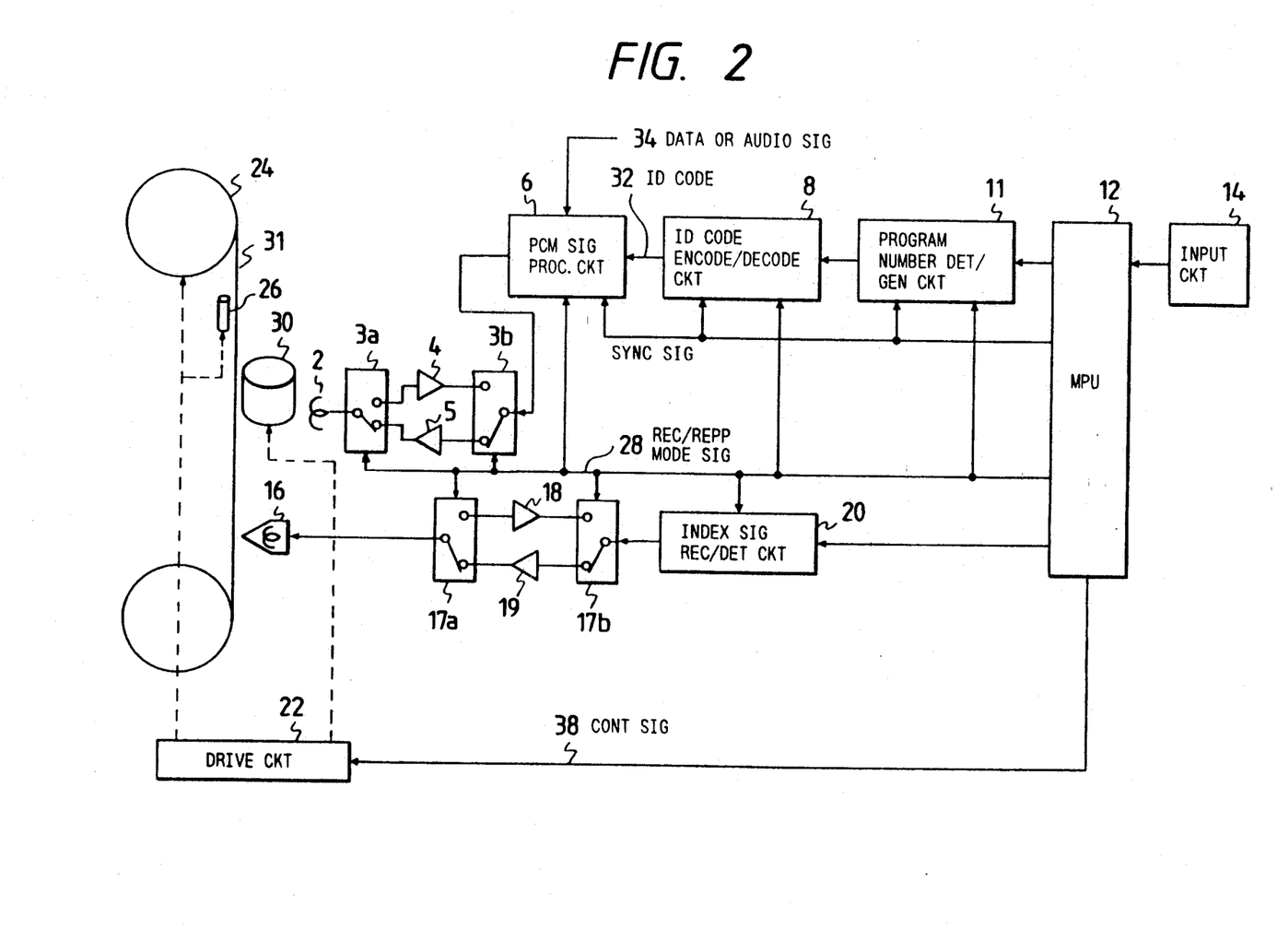
FIG. 2 is a block diagram of a modified embodiment of a data reproduction apparatus operating in the record mode.

FIG. 2 is a block diagram of a modified embodiment of the digital reproduction apparatus with a recording function, which shows recording the ID code and the index signal. The record/reproduce mode switching signal changes the system to the record mode. In FIG. 2, the rotary heads 2 record PCM digital data which is made by mixing the data or audio signal 34 with the ID code from the ID code encode/decode circuit 8 including the program number. The program number is generated by program number detection/generation circuit 11 in response to an output of the microprocessing unit 12. The microprocessing unit 12 produces an index signal which is recorded by the fixed control head 16 through the index signal record/detection circuit 20. The digital data reproduction apparatus with the recording function can record a program after executing the search operation shown in the flow of FIG. 8, to thereby record a new program over an identified previously recorded program.

The index signal record/detection circuit writes an index signal onto a magnetic tape 31 in response to an index signal write request command from the microprocessing unit 12. The index signal, which has been used in the conventional VTR, is recorded by recording a control signal whose duty ratio is changed at a top or header portion of a program on the magnetic tape 31 by the control head in a control track.

Figure 3:
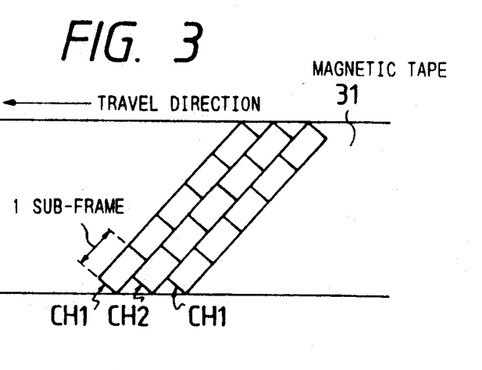
FIG. 3 schematically illustrates a track pattern on the magnetic tape.

FIG. 3 schematically illustrates a track pattern on the magnetic tape of the modified embodiment of the digital data reproduction apparatus of the invention.

Figure 4:
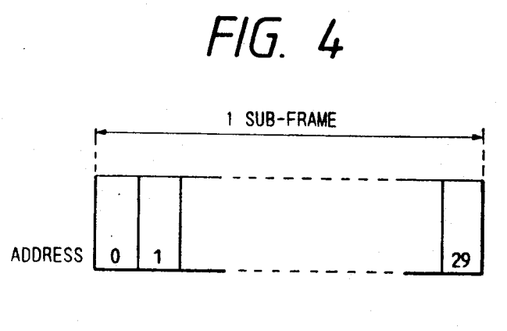
FIG. 4 schematically illustrates one sub-frame of a track pattern.

In the PCM audio VTR, PCM audio data and an ID code are recorded on tracks of the magnetic tape 31 as shown in FIG. 3. Each track (field) is divided into five sub-frames. Each sub-frame is further divided into thirty blocks identified by addresses zero to twenty-nine, as shown in FIG. 4. Each block has a synchronizing signal region (8 bits), an address signal region (8 bits), an ID code region (8 bits), a parity check signal region (8 bits) for error check of the address signal and the ID code, and a PCM audio data region ($31 \times 8$ bits), in that order.

Figure 5:
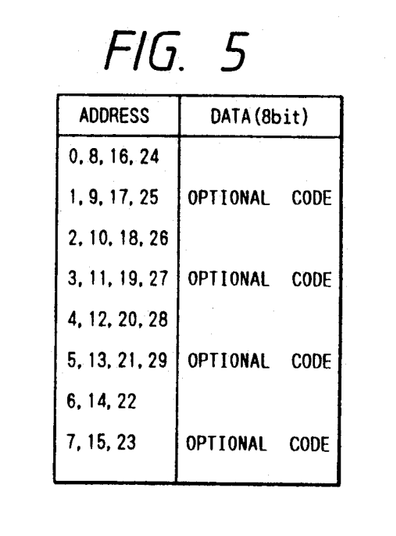
FIG. 5 shows a format for recording ID codes.

FIG. 5 shows a format for recording ID codes on respective blocks.

Data in the ID code regions of blocks whose addresses are "1, 9, 17, 25", "3, 11, 19, 27", "5, 13, 21, 29", and "7, 15, 23" out of the addresses from zero to 29 are used as optional codes (eight bits each), as shown in FIG. 5.

Figure 6:
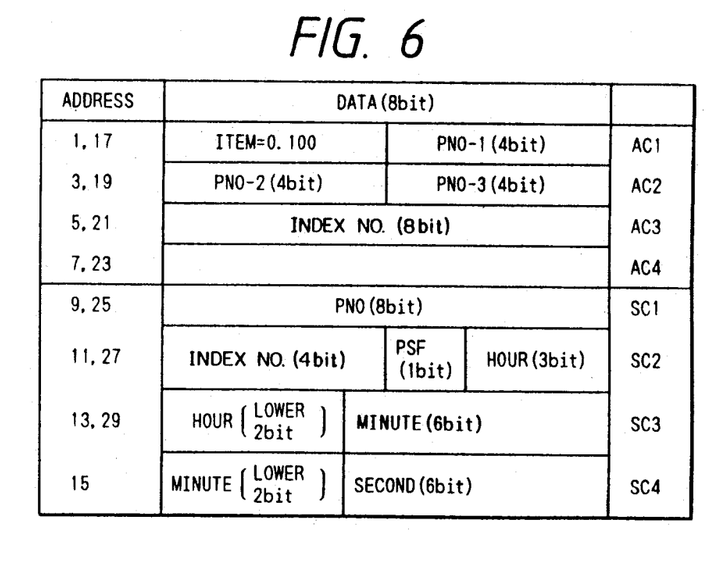
FIG. 6 shows a detailed format for recording ID codes.

An item (ITEM) of four bits and hundreds digit (PNO-1) of a program number can be recorded in the ID code regions of address 1 and address 17, as shown in FIG. 6. Similarly, in addresses 3 and 19, tens digit 2 (PNO-2) and units digit (PNO-3) of the program number are recorded. In address 5 and address 21, an index number (eight bits), which is expressed in the binary coded decimal notation (BCD), can be recorded.

The ITEM (four bits) indicates that data AC1 to AC4 show a program number and an index number are recorded when the ITEM is "0100". Respective digits PNO-1, PNO-2 and PNO-3 of a program number are expressed in binary coded decimal (BCD) notation.

Data in the ID code regions of these addresses 1, 3, 5, and 7 (17, 18, 21, and 23) make up data AC1 and AC4. Each of data AC1 to AC4 is recorded at least once a field (track).

Moreover, the program number expressed in 8-bit binary notation is recorded in address 9 and address 25. In address 11 and address 27, an index number (four bits), which is expressed in a binary notation and has the same value of the index number (BCD) recorded on the addresses 5 and 21, and a program start flag PSF (one bit) are recorded in the former five bits. Absolute time from a start of recording on the magnetic tape is recorded in binary notation on the latter three bits of addresses 11 and 27 and in addresses 13, 29, and 15. The program number shows the ordinal number of programs and is a binary number. The index number expressed in 4-bit binary notation shows the index number in each program. The program start flag PSF (one bit) is provided to recognize the start of each program by recording "1" for three hundred frames at start of the program.

A blank shown in FIG. 6 indicates an unused region.

As mentioned above, this invention in the context of a preferred embodiment. According to the concept of the invention, various modifications can be considered. For example, it is possible to set the apparatus into a mode other than the reproducing mode, i.e., still, power-off, timer standby, eject modes, which are indicated by a next function memory included in the microprocessing unit 12.

Moreover, an index number can be used instead of the program number. It is possible that the same program number is recorded over the magnetic tape 31, and at every change of programs the index number is changed and an index signal is recorded at the same time. This enables searching with the index number and the index signal.

Further, a start position specified by the program number and index number, which is represented by absolute time from the start of the tape as TOC data, is recorded over the magnetic tape. In the recording mode, at every change of the index number the index signal is recorded. This provides searching using the TOC data to utilize the program number and the index number.

In accordance with the embodiment described above, the invention provides the following advantages:

This invention can be provided by the PCM circuit 32 and a program for the micro-computer in the mechanical control circuit at a low cost.

Moreover, this invention improves the apparatus in operation because searching only requires detection of an absolute address.

What is claimed is:

1. A helical scan digital data reproduction apparatus for reproducing data from a magnetic recording medium on which each helically scanned track includes a plurality of information blocks, each information block including a synchronizing signal, an identification code including a program number and data for reproduction, said magnetic recording medium also having an index signal recorded on a longitudinal control track by changing duty ratio of a control signal at a start of a program, said apparatus comprising:
   (a) input means for inputting a desired program number to be searched;
   (b) helical scanning head means for reading out a synchronizing signal, said data, and said identification code from said magnetic recording medium;
   (c) synchronizing signal detection means responsive to an output of said helical scanning head means for detecting said synchronizing signal;
   (d) separation means responsive to an output of said helical scanning head means for separating said data and said identification code in accordance with a given timing determined by said synchronizing signal;
   (e) detecting means responsive to said identification code for detecting and outputting said program number included herein;
   (f) control head means for reading said control signal on said longitudinal control track;
   (g) index signal detection means for detecting said index signal from said control signal; and
   (h) control means responsive to said desired program number, said detected program number, and said index signal for searching said start of a program corresponding to said desired program number in accordance with a difference between said detected program number and said desired program number, said difference being changed in response to said index signal in a searching mode.

2. A helical scan digital data reproduction apparatus as claimed in claim 1, wherein said control means determines a direction of said searching by comparing said detected program number with said desired program number of said data.

3. A helical scan digital data reproduction apparatus as claimed in claim 1, wherein said magnetic recording medium is a magnetic tape and said control means determines either of forward-winding or rewinding of said magnetic tape for said searching by comparing said detected program number with said desired program number of said data.

4. A helical scan digital data reproduction apparatus as claimed in claim 3, wherein said control means performs said forward-winding when said detected program number is smaller than said desired program number of said data.

5. A helical scan digital data reproduction apparatus as claimed in claim 4, wherein said control means maintains said forward-winding until said difference becomes zero.

6. A helical scan digital data reproduction apparatus as claimed in claim 3, wherein said control means performs said rewinding in response to detection that said difference becomes zero to return said magnetic tape to position said scanning head means at a position relative to said magnetic tape just preceding a most recently detected index signal.

7. A helical scan digital data reproduction apparatus as claimed in claim 3, wherein said control means performs said rewinding when said detected program number is larger than said desired program number of said data.

8. A helical scan digital data reproduction apparatus as claimed in claim 7, wherein said control means maintains said rewinding until said difference becomes zero.

9. A helical scan digital data reproduction apparatus as claimed in claim 8, wherein said control means performs said forward-winding in response to detection that said difference becomes zero to adjust a position of said magnetic tape to position said scanning head means at a position relative to said magnetic tape just preceding a most recently detected index signal.

10. A helical scan digital data reproduction apparatus as claimed in claim 1, wherein said control means causes said helical scanning head means, synchronizing signal detection means, separation means, detecting means, and control head means to reproduce said data in response to termination of said searching.

11. A helical scan digital data reproduction apparatus as claimed in claim 1, further comprising recording means for recording input data, said control means causing said recording means to record said input data through said helical scanning head means in response to termination of said searching.

12. A helical scan digital data reproduction apparatus as claimed in claim 1, further comprising second control means responsive to said desired program number and to an output of said detecting means for causing the first mentioned control means to search said start of said program when said detected program number has been outputted and for causing said detecting means to detect said program number using said helical scanning head means, said synchronizing signal detection means and said separation means, and for thereafter causing said control means to search said start of said program when said detected program number has not been outputted.

13. A helical scan digital data reproduction apparatus for reproducing data from a magnetic recording medium having a plurality of programs recorded thereon, the magnetic recording medium including a plurality of helically scanned tracks each including a plurality of information blocks, each information block including a synchronizing signal, an identification code including a program number and data for reproduction, the magnetic recording medium further having a longitudinal control track having a control signal recorded thereon and an index signal recorded thereon at a start of each program as a changed duty ratio of the control signal, said apparatus comprising;
   (a) input means for inputting a desired program number to be searched;
   (b) helical scanning head means for reading out a synchronizing signal, said data, and said identification code from said magnetic recording medium;

(c) synchronizing signal detection means responsive to output of said helical scanning head means for detecting said synchronizing signal;
(d) separation means responsive to an output of said helical scanning head means for separating said data from said identification code in accordance with a given timing determined by said synchronizing signal;
(e) detecting means responsive to said separation means for detecting and outputting said program number included in said identification code;
(f) control head means for reading said control signal on said longitudinal control track;
(g) index signal detection means responsive to said control head means for detecting said index signal on said longitudinal control track; and
(h) control means responsive to said desired program number inputted by said input means, to said detected program number from said detecting means, and to said index signal from said index signal detection means for establishing a search mode for searching for a start of a program corresponding to said desired program number, said control means including:
i) first means for obtaining a difference between said desired program number from said input means and said detected program number from said detecting means,
ii) second means for moving said magnetic recording medium in a first direction to reduce said difference between said detected program number and said detected program number,
ii) third means for changing said program number detected by said detecting means in response to said index signal provided during said search mode from said index signal detection means, and
iii) fourth means for comparing the program number changed by said third means with said desired program number and for causing said second means to move said magnetic recording medium when a result of the comparison is indicative of the program number changed by said third means and the desired program number being unequal.

14. A helical scan digital data reproduction apparatus in accordance with claim 13, wherein said control means further includes overrun correction means responsive to said fourth means for correcting overrun of the magnetic recording medium when the result of the comparison indicates the changed program and the desired program number are equal.

15. A helical scan digital data reproduction apparatus in accordance with claim 14, wherein said overrun correction means responds to an equal result of the comparison by controlling said second means to move said magnetic recording medium in a second direction opposite to said first direction and at a lower speed than moving in said first direction until an index signal is detected by said index signal detection means.

16. A helical scan digital data reproduction apparatus in accordance with claim 15, wherein said control means is responsive to said overrun correction means and to said index signal detection means for controlling said digital data reproduction apparatus to reproduce data from the start of the program corresponding to said desired program number recorded on said helically scanned tracks when said index signal detection means detects an index signal while said second means moves said magnetic recording medium in said second direction at said lower speed.

17. A helical scan digital data reproduction apparatus in accordance with claim 15, wherein said control means is responsive to said overrun correction means and to said index signal detection means for controlling said digital data reproduction apparatus to reproduce data from the start of the program corresponding to said desired program number recorded on said helically scanned tracks when said index signal detection means detects a first index signal after said second means begins to move said magnetic recording medium in said second direction at said lower speed.

* * * * *